United States Patent [19]

Kitagishi

[11] Patent Number: 5,069,537
[45] Date of Patent: Dec. 3, 1991

[54] IMAGE DEFLECTING DEVICE
[75] Inventor: Nozomu Kitagishi, Tokyo, Japan
[73] Assignee: Canon Kabushiki Kaisha, Tokyo, Japan
[21] Appl. No.: 283,570
[22] Filed: Dec. 13, 1988
[30] Foreign Application Priority Data
Dec. 23, 1987 [JP] Japan .................. 62-325716
[51] Int. Cl.$^5$ .................. G02B 27/64; G02B 26/08
[52] U.S. Cl. .................. 359/557; 359/196; 359/813
[58] Field of Search ............ 350/500, 297, 484, 6.3; 354/400
[56] References Cited
U.S. PATENT DOCUMENTS

| | | | |
|---|---|---|---|
| 4,467,188 | 8/1984 | Suzuki et al. | 250/204 |
| 4,500,188 | 2/1985 | Kitagishi et al. | 354/406 |
| 4,547,663 | 10/1985 | Kitagishi et al. | 250/201 |
| 4,586,786 | 5/1986 | Suzuki et al. | 350/169 |
| 4,650,988 | 3/1987 | Suzuki et al. | 250/216 |
| 4,776,679 | 10/1988 | Kitagishi et al. | 350/427 |
| 4,781,446 | 11/1988 | Tanaka et al. | 350/426 |
| 4,810,070 | 3/1989 | Suda et al. | 350/413 |
| 4,844,602 | 7/1989 | Kitagishi et al. | 350/500 |

FOREIGN PATENT DOCUMENTS

| | | | |
|---|---|---|---|
| 56-34847 | 4/1981 | Japan . | |
| 0047012 | 2/1987 | Japan | 350/500 |
| 56-47012 | 2/1987 | Japan . | |

Primary Examiner—Bruce Y. Arnold
Assistant Examiner—Ronald M. Kachmarik
Attorney, Agent, or Firm—Fitzpatrick, Cella, Harper & Scinto

[57] ABSTRACT

In an optical system comprising a plurality of lens units, one of which is used as a compensation lens unit capable of decentering to compensate for the image blur, an image magnification $\beta c$ of the compensation lens unit satisfies the following condition:

$$-1.4 < \beta c < -0.7$$

13 Claims, 5 Drawing Sheets

IMAGE DEFLECTING DEVICE

BACKGROUND OF THE INVENTION

1. Field of the Invention:

This invention relates to image deflecting devices and, more particularly, optical devices for stabilizing an image against unexpected vibrations.

2. Description of the Related Art:

When the photographer takes shots from a running car, flying aircraft or another moving vehicle, vibrations are applied to a photographic system, causing production of an image blur. Even if the photographer is not riding on the moving vehicle, hand shakes will cause the image to blur. In either case, the image quality is dropped.

As disclosed, for example, in Japanese Patent Publications Nos. Sho 56-34847 and 57-7416, there is a technique of preventing the image from blurring by utilizing a prism of variable vertical angle which is added to the photographic lens. However, there are drawbacks that the size of the whole optical system including the prism is increased and when the vertical angle of the prism is made variable, a control mechanism for the vertical angle becomes complicated, etc. Also, meanwhile, as a proposal for removing these drawbacks, there is, for example, Japanese Laid-Open Patent Application No. Sho 62-47012. According to this proposal, a portion of the photographic lens system, i.e., a compensation lens unit, is made to decenter out of alignment to the optical axis. Thus, the image is deflected. Therefore, without a supplemental optical system such as a prism, a stabilized image can be obtained in a relatively small-sized photographic lens system with ease.

However, in the optical system described in the above Japanese Laid-Open Patent Application No. Sho 62-47012, when stabilizing the image against vibrations, the compensation lens unit which lies behind the afocal optical system must be decentered in a direction exactly perpendicular to the optical axis. However, actually, the compensation lens unit shifts to no small extent in the direction of the optical axis.

Such a shift of the compensation lens unit in the direction of the optical axis results in defocusing of the image, thus giving rise to a new problem. Although it is possible to some extent to move the compensation lens unit accurately in the direction perpendicular to the optical axis for the purpose of avoiding this problem as far as possible, a complicated structure of the moving mechanism, an increase of the size and a high production cost are required.

As the art related to the present invention, there are U.S. patent applications Ser. Nos. 116,541 filed on Nov. 4, 1987 (now U.S. Pat. No. 4,844,602), Ser. No. 156,930 filed on Feb. 17, 1988 (now U.S. Pat. No. 4,907,868) and Ser. No. 261,231 filed on Oct. 24. 1988.

SUMMARY OF THE INVENTION

An object of the present invention is to provide an optical system capable of reducing the defocusing of an image caused by a compensation lens unit when decentering so as to compensate for an image blur.

Another object is to provide a photographic optical system capable of obtaining a stabilized image by the use of a simple drive mechanism.

To attain these objects, according to the invention, a compensation lens unit caused to decenter with respect to the optical axis to obtain an stabilized image has an image magnification $\beta c$ satisfying the following condition:

$$-1.4 < \beta c < -0.7$$

DETAILED DESCRIPTION OF THE PREFERRED EMBODIMENTS

At first, explanation starts from the problem which would be caused in a case where, for example, an optical system shown in the above Japanese Laid-Open Patent Application No. Sho 62-47012 is combined to a moving mechanism for a compensation lens unit adaptable to the present invention.

Figure 1A:
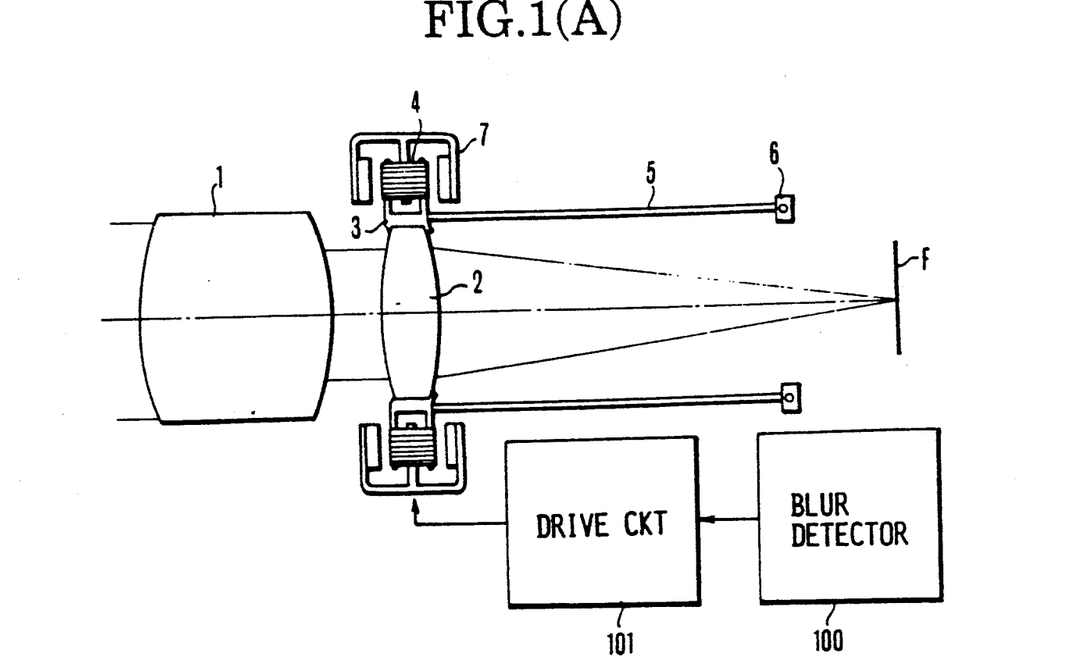
FIGS. 1(A) and 1(B) are explanatory diagrams where a conventional vibration-proof optical system is incorporated into a moving mechanism for a compensation lens unit adaptable to the present invention.

FIG. 1(A) shows a reference state, in which a fixed lens unit 1 makes its emerging light afocal, and a compensation lens unit 2 which is driven to decenter for the purpose of compensating for the image blur is positioned behind the fixed lens unit 1. F represents an image sensing plane.

The compensation lens unit 2 is held by a holding member 3. The holding member 3 is pivotally supported on four fulcrum points 6 of a housing (not shown), and is flexibly supported by four wires 5, for example, piano wires, etc. (two wires being shown in the figure) for moving the compensation lens unit 2 in vertical directions and perpendicular directions relative to the drawing paper. Incidentally, though, in this figure, each of the wires 5 is depicted long for convenience, its actual length is from several mm to several cm. The holding member 3 is provided with coils 4 which are in a magnetic relation to yokes 7 fixedly mounted to the housing. Reference numeral 100 denotes a blur detector consisting of an acceleration detector, and 101 denotes a drive circuit for driving the compensation lens unit 2 in a direction in which the image is stabilized on the basis of an output of the blur detector 100, both being arranged within a lens barrel. Hereinafter, the blur detector 100 and the drive circuit 101 will be omitted from the description.

The coils 4 each are of the so-called voice coil type in which by supplying a variable current to the coils 4 by the drive circuit 101 on the basis of an output of the blur detector 100 consisting of an acceleration detector, the compensation lens unit 2 is driven to decenter in a direction perpendicular to the optical axis.

Figure 1B:
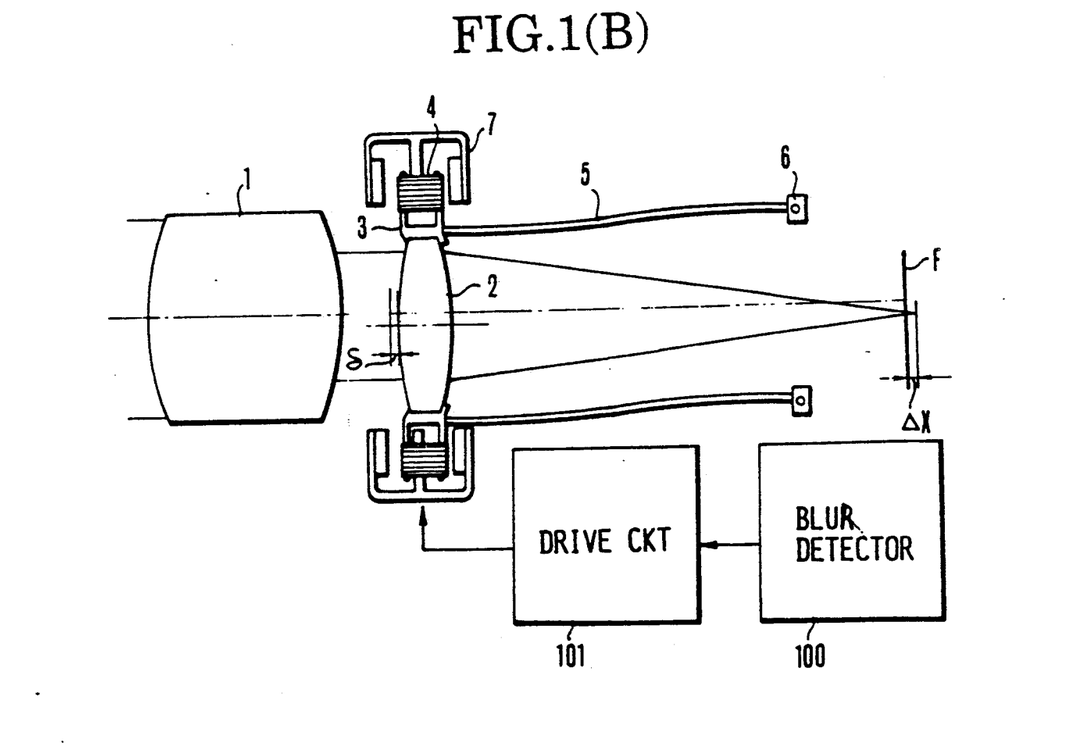

Next, a state in which the compensation lens unit 2 has been driven to decenter is shown in FIG. 1(B). To stabilize the image, the compensation lens unit 2 is moved in a direction perpendicular to the optical axis by the voice coils 4. At the same time, the wires 5 also are influenced, causing the compensation lens unit 2 to move even in the direction of the optical axis by a distance δ. For this reason, in a case where incident light on the compensation lens unit 2 is afocal as in this example, a defocusing takes place at the image plane by a distance ΔX which is the same as the distance δ by which the compensation lens unit 2 has moved in the direction of the optical axis. Here suppose, for example, the length of each of the wires 5 is 15 mm and the decentering amount in a direction perpendicular to the optical axis is 1.4 mm, then the compensation lens unit 2 moves 0.08 mm even in the direction of the optical axis. Thus, a defocusing of 0.08 mm occurs. In actual practice, a much larger image blur must be compensated for. After all, the production of such a defocusing during decenter-driving renders the lens system useless.

And, this defocusing, when the decentering amount of the compensation lens unit 2 increases, gets more conspicuous. Incidentally, in a case where incident light on the compensation lens unit 2 is afocal, the ratio of the deflecting amount ΔY of the image to the decentering amount E of the compensation lens unit 2, in other words, the decentering sensitivity S, is "1", and the ratio of the defocusing amount ΔX to the axial movement amount δ of the compensation lens unit 2, in other words, the focusing sensitivity s is also "1".

According to the invention, a power arrangement of the vibration-proof lens is provided such that when the compensation lens unit is driven to decenter so as to compensate for the image blur, a defocusing of the image becomes minimum. For this purpose, it is desired that a large image deflection is obtained by a small decentering of the compensation lens unit, and that the defocusing is small relative to the axial movement of the compensation lens unit. In other words, such an objective lens that the decentering sensitivity of the compensation lens unit is large and the focusing sensitivity is small, is desired.

Conditions for attaining such a desire are described below.

In a photographic lens system constructed with, for example, two lens units, when the lens unit of the image side is made as a compensation lens unit and the image magnification of the compensation lens unit is made to be $\beta c$, the decentering sensitivity S of the compensation lens unit is expressed by the following equation:

$$S = 1 - \beta c \quad (1)$$

Meanwhile, the focusing sensitivity s is expressed by the following equation:

$$s = 1 - \beta c^2 \quad (2)$$

Then, the conditions that the decentering sensitivity S is large and the focusing sensitivity s is small, are:

$$1 - \beta c > 1 \quad (3)$$

$$1 - \beta c^2 \approx 0 \quad (4)$$

A solution of satisfying these two conditions (3) and (4) is to choose the image magnification of the compensation lens unit at $\beta c \approx -1$. At this time, the decentering sensitivity S is "2". That is, when the compensation lens unit is driven to decenter in a direction substantially perpendicular to the optical axis by an amount of movement E, the amount of movement of the image can be obtained to be 2E. Thus, the image can be deflected largely by the small drive amount. Meanwhile, the focusing sensitivity s becomes "0". Hence a vibration-proof lens which, even if the compensation lens unit more or less axially moves during the driving, does not produce the defocusing, can be obtained.

According to the invention, to obtain a better optical performance while simplifying the drive mechanism for decentering, it is proper to satisfy the following inequalities of condition.

That is, letting the image magnification of the compensation lens unit be denoted by $\beta c$, $$-1.4 < \beta c < 0.7 \quad (5)$$

Next, the upper limit and lower limit of this condition (5) are explained.

When the upper limit is exceeded, the defocusing amount gets larger so that a high accuracy of decentering control is required, and the refractive index of the compensation lens unit gets stronger with an increase of the aberrations which appear during decentering.

When the lower limit is exceeded, the defocusing amount also gets larger, and the power borne by lens units positioned before and after the compensation lens unit gets higher. So it is not desirable.

Next, embodiments according to the invention are described.

Figure 2:
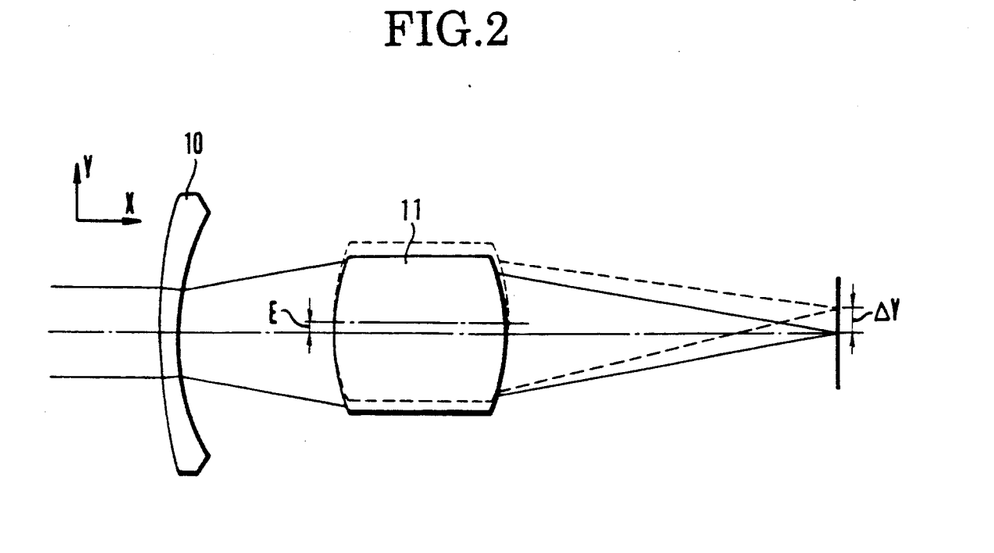
FIG. 2 is a lens block diagram of a photographic lens system as a first embodiment of the invention.

FIG. 2 is a lens block diagram illustrating a first embodiment corresponding to Table 1 to be described later. This photographic lens system is of the retrofocus type. The entire system is constructed with, from front to rear, a negative lens unit 10 and a positive lens unit 11. The positive lens unit 11 is made to be a compensation lens unit which is driven to decenter so as to compensate for the image blur. In this embodiment, the compensation lens unit 11 is designed to have an image magnification of $-1X$. With the employment of such a power arrangement, the ratio of the deflecting amount ΔY of the image to the decentering amount E of the compensation lens unit 11 in the direction perpendicular to the optical axis, i.e., the decentering sensitivity S, becomes "2". Thus the image can be deflected largely by a slight amount of movement of the compensation lens unit 11. Meanwhile, the ratio of the defocusing amount ΔX to the minute axial movement amount δ of the compensation lens unit 11, i.e., the focusing sensitivity s is "0".

Figure 4A:
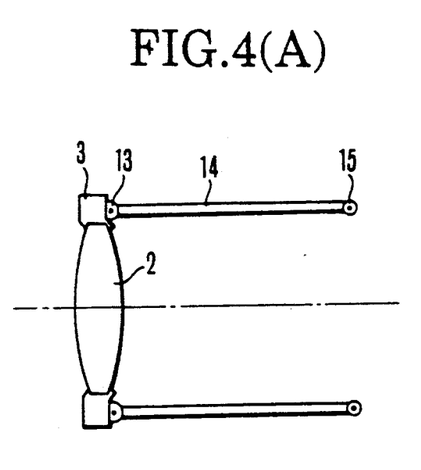
FIGS. 4(A) and 4(B) are diagrams illustrating a moving mechanism for a compensation lens unit according to the invention.
Figure 4B:
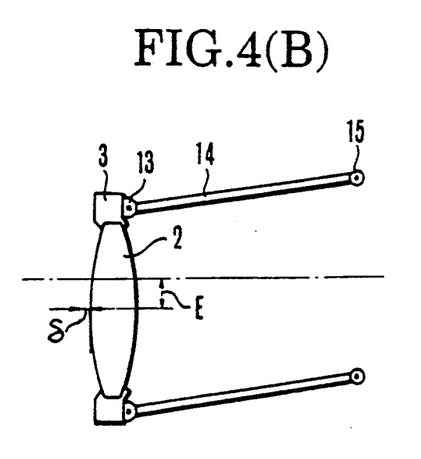

This value of the focusing sensitivity s is obtained when the axial movement of the compensation lens unit 11 is in a minute range. When really calculated, in the case of the first embodiment, even if an axial movement amount δ of the compensation lens unit 11 is as large as +1 mm, the defocusing amount ΔX is just +0.012 mm, being nearly negligible. For this reason, the degree of allowance for the accuracy of the compensation lens unit in the axial direction can be set loose and the room for design of a drive and support mechanism becomes large. For example, in the type using a plurality of support wires 5 shown in FIGS. 1(A) and 1(B), or in a type shown in FIGS. 4(A) and 4(B), wherein the holding member 3 of the compensation lens unit 2 is supported by bars 14 through hinges 13 and the bars 14 are made turnable around hinges 15, and an actuator (not shown) drives, for example, the bars 14 as shown in FIG. 4(B), when the compensation lens unit 2 is driven to decenter and displace in the axial direction by a distance δ, almost no defocusing takes place. It should be noted that the relationship between the axial movement amount $\delta$ and the decentering amount E in terms of the length l of each of the bars 14 is expressed by $\delta = l(1 - \cos\theta)$ where $\theta = \sin^{-1}(E/l)$.

Figure 3:
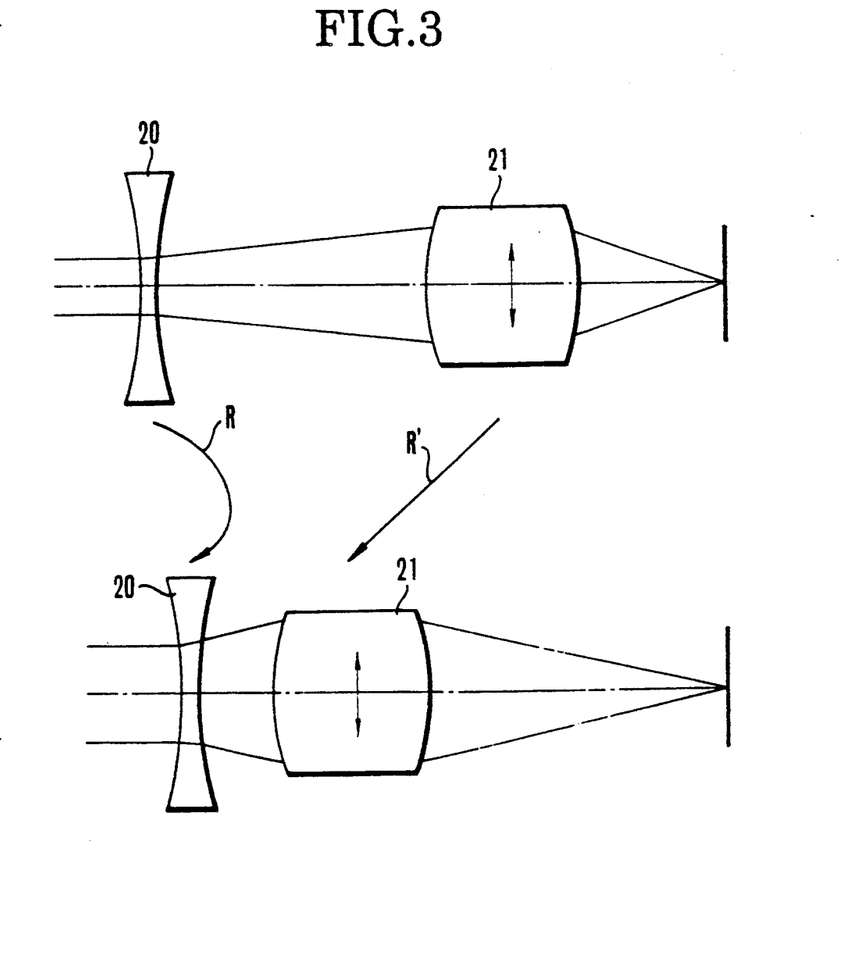
FIG. 3 is a lens block diagram of a photographic lens system as a second embodiment of the invention.

FIG. 3 is a lens block diagram of a second embodiment corresponding to Table 2. This is a 2-unit zoom lens system comprising, from front to rear, a negative lens unit 20 and a positive lens unit 21. When zooming from the wide angle side to the telephoto side, they depict loci of arrows R and R= respectively. And the positive lens unit 21 is made to be a compensation lens unit that satisfies the conditions of the invention. It should be noted that in the zoom lens system it is usually impossible to make the image magnification of the compensation lens unit to satisfy the condition (1) of the invention throughout the entire zooming range. Yet in this embodiment, the zoom lens system has been designed so that the condition (5) is satisfied when the focal length of the entire system is in a range of not less than 119 mm. Therefore, the focusing sensitivity s is made minimum in that region of the zooming range which is not less than 119 mm.

In the zoom lens system, (i) it is generally at the long focal length positions, i.e., near or at the telephoto end, that the effect of the hand shakes is particularly conspicuous, and this region is desired to be subjected to the vibration proof. This implies that it is possible to construct the zoom lens system of such a structure that the vibration-proofing is effected only near or at the telephoto end; (ii) for the same angle of displacement of the camera with the sight line, the amount of image blur in the wide angle end is smaller than in the telephoto end, so that a small amount of decentering of the compensation lens unit suffices; and (iii) in general, the influence of the manufacturing errors of each element of the zoom lens system on a one-sided blur is smaller in the wide angle end than in the telephoto end, so that, for the same defocusing, the result is less appreciable. From these reasons, the focusing sensitivity in the wide angle end is more acceptable than that in the telephoto end. Hence, such features as in this embodiment are realistic.

Figure 5:
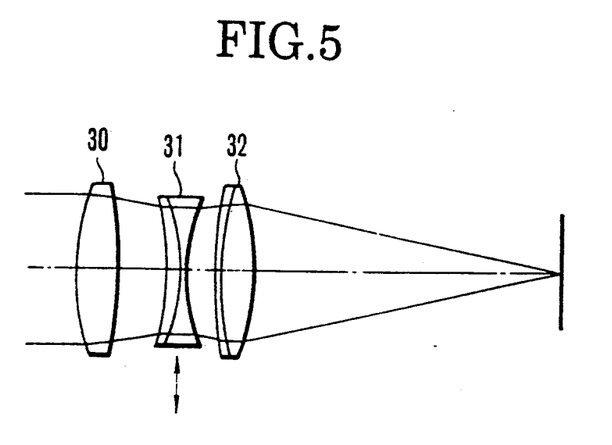
FIG. 5 is a lens block diagram of a photographic lens system as a third embodiment of the invention.

FIG. 5 is a lens block diagram illustrating a third embodiment corresponding to Table 3. This is an objective lens system comprising three lens units 30, 31 and 32 having positive, negative and positive refractive powers in this order from front. In the objective lens' system of the triplet, Tessar, Heliar or like type, the lens units each are constructed with at least one positive lens or at least one negative lens. The negative lens unit 31 is made to be a compensation lens unit and driven to decenter so as to compensate for the image blur. Although, in this embodiment, the fixed lens unit 32 which remains stationary relative to decentering is provided on the image side of the compensation lens unit, the principle of the invention can effectively be used. In the vibration-proof optical system such as that of this embodiment comprised of the fixed lens unit 30, the compensation lens unit 31 and the fixed lens unit 32, to minimize the decentering aberrations produced when decentering is performed, it is desirable that at least the compensation lens unit 31 be constructed with at least one positive lens and one negative lens. The fixed lens unit 32 which is on the image side of the compensation lens unit 31, if also constructed with at least one positive lens and one negative lens, can afford a further reduction of the decentering aberrations.

Figure 6:
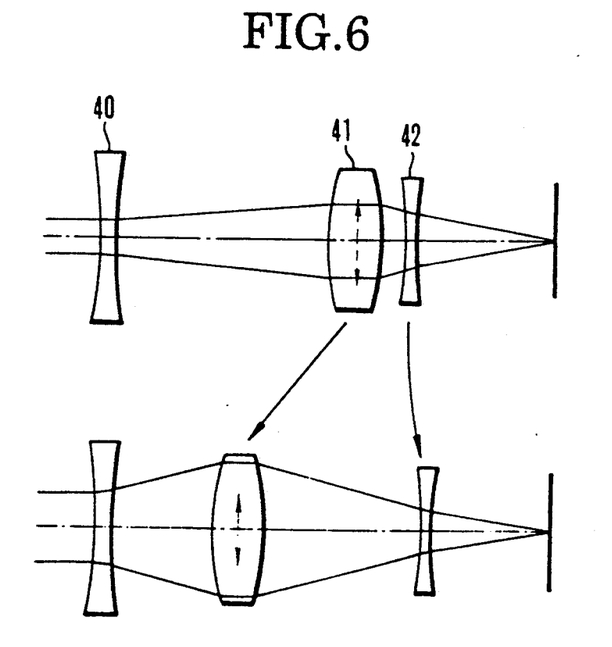
FIG. 6 is a lens block diagram of a 3-unit zoom lens as a fourth embodiment of the invention.

Next, FIG. 6 is a lens block diagram illustrating a fourth embodiment corresponding to Table 4. The fourth embodiment is a zoom lens system comprising three lens units 40, 41 and 42 having negative, positive and negative refractive powers, respectively, in this order from front, the second lens unit 41 being driven to decenter as a compensation lens unit. Even in this embodiment, the conditions of the invention are satisfied near or at the telephoto end where the image blur is large, so that the defocusing resulting from the decentering can be minimized.

By the way, the decentering sensitivity S and the focusing sensitivity s of the compensation lens unit of the vibration-proof optical system constructed by the fixed lens unit which remains stationary relative to the decentering, the compensation lens unit and the fixed lens unit are expressed by the following equations:

$$S = (1 - \beta c) \cdot \beta d \tag{6}$$

$$s = (1 - \beta^2 c) \cdot \beta^2 d \tag{7}$$

where $\beta d$ is the image magnification of the fixed lens unit which is positioned on the image side of the compensation lens unit. It is understandable that the advantage lies near or at $-1X$ in the image magnification $\beta c$ of the compensation lens unit. That is, if the image magnification $\beta c$ is chosen at $-1$, the decentering sensitivity S is $2\beta d$, and the focusing sensitivity s is "0". In other words, the decentering sensitivity S depends on the image magnification of the fixed lens unit positioned on the image side. By taking this image magnification at a large value, the decentering sensitivity S can be made large. That is, the drive amount can be made small, and this is advantageous on the moving mechanism. Particularly to a piezoelectric element or like actuator which, though its response speed is fast, does not provide too much drive stroke, the advantage is greater.

It should be noted that the term "fixed" lens unit in the specification means that it is stationary relative to the decentering in a direction perpendicular to the optical axis, and that even if axially movable lenses such as a focusing lens and a zoom lens are included in the photographic lens system, they are called the fixed lens units.

In the following, numerical examples are shown.

In the tables, $f_T$ is the focal length of the entire lens system, $f_i$ and $\beta_i$ are the focal length and image magnification of a lens unit having a reference numeral i, and e is the principal point interval between lens units.

TABLE 1

| The First Embodiment (FIG. 2) | |
|---|---|
| $f_T =$ | 100 |
| $f_{10} =$ | $-100$ |
| $f_{11} =$ | 85 |
| $e =$ | 70 |

| Compensation Lens Unit 11 | |
|---|---|
| Image Magnification | $-1\times$ |
| Decentering Sensitivity | 2 |
| Focusing Sensitivity | 0 |

TABLE 2

The Second Embodiment (FIG. 3)
$f_T = 100-200$, $f_{20} = 170$, $f_{21} = 130$

| | Principal Point | Compensation Lens Unit 21 | | |
| | Interval between | Image | | |
| | 1st and 2nd Lens | Magni- | Decentering | Focusing |
| $f_T$ | Units (e) | fication | sensitivity | sensitivity |
|---|---|---|---|---|
| 100 | 181 | $-0.588\times$ | 1.588 | 0.654 |

TABLE 2-continued

The Second Embodiment (FIG. 3)
$f_T = 100$–$200$, $f_{20} = 170$, $f_{21} = 130$

| $f_T$ | Principal Point Interval between 1st and 2nd Lens Units (e) | Compensation Lens Unit 21 Image Magnification | Decentering sensitivity | Focusing sensitivity |
|---|---|---|---|---|
| 170 | 90 | $-1\times$ | 2 | 0 |
| 200 | 70.5 | $-1.176\times$ | 2.176 | $-0.384$ |

TABLE 3

The Third Embodiment (FIG. 5)

| $f_T = 100$ | | Image Magnification |
|---|---|---|
| $f_{30} = 82$ | $e_1 = 30$ | ($\beta_{30} = 0$) |
| $f_{31} = -26$ | $e_2 = 25$ | ($\beta_{31} = -1$) |
| $f_{32} = 42.308$ | | ($\beta_{32} = -1.2195$) |

| Compensation lens Unit 31 | |
|---|---|
| Decentering sensitivity | $-2.439$ |
| Focusing sensitivity | 0 |

TABLE 4

The Fourth Embodiment (FIG. 6)
$f_T = 100$–$216$, $f_{40} = -138.86$, $f_{41} = 77.15$,
$f_{42} = -266.03$

| $f_T$ | $e_1$ | $e_2$ | S | s | $\beta_{40}$ | $\beta_{41}$ | $\beta_{42}$ |
|---|---|---|---|---|---|---|---|
| 100 | 83.32 | 48.68 | 2.065 | 2.334 | 0 | $-0.532\times$ | $1.354\times$ |
| 216 | 16.66 | 55.54 | 3.128 | 0.099 | 0 | $-0.984\times$ | $1.579\times$ |

Note:
$e_1$: The principal point interval between the first and second lens units;
$e_2$: The principal point interval between the second and third lens units;
S: The decentering sensitivity of the compensation lens unit 41;
s: The focusing sensitivity of the compensation lens unit 41;
$\beta$: The image magnification.

As has been described above, by choosing the image magnification of the compensation lens unit so as to satisfy the conditions of the invention, it is made possible to maximize the decentering sensitivity while nevertheless minimizing the focusing sensitivity. Therefore, to compensate for the equivalent image blur, the required amount of decentering movement of the compensation lens unit can even be minimized. Yet, because the focusing sensitivity is at a minimum, the tolerance for the axial dimensions can be made rougher. Thus, the structure of the driving and holding mechanisms can be simplified. In addition, a driving mechanism which, in principle, moves also in the direction of the optical axis can be used.

What is claimed is:

1. An optical device for deflecting an image, comprising:
    objective lens means including a plurality of lens units; and
    driving means for causing one lens unit of said plurality of lens units to decenter relative to an optical axis of said optical device,
    where an image magnification of said one lens unit is denoted by $\beta c$, the following condition being satisfied:

$$-1.4 < \beta c < -0.7$$

2. An optical device according to claim 1, further comprising detecting means for detecting a motion of said optical device, and wherein said driving means causes said one lens unit to decenter on the basis of a detection results of said detecting means.

3. An optical device according to claim 2, wherein said one lens unit caused to decenter varies its image magnification to vary magnifying power of said objective lens means.

4. An optical device according to claim 3, wherein said image magnification $\beta c$ is a value obtained when said one lens unit is in its telephoto end.

5. An optical device according to claim 1, wherein said objective lens means includes, from front to rear, a negative lens unit having a negative refractive power, and a positive lens unit having a positive refractive power, and wherein said one lens unit caused to decenter corresponds to said positive lens unit.

6. An optical device according to claim 5, wherein said negative lens unit and said positive lens unit are movable along the optical axis to vary magnifying power of said objective lens means, and wherein an image magnification of said positive lens unit in its telephoto end satisfies said condition.

7. An optical device according to claim 1, wherein said objective lens means includes from front to rear,
    a front positive lens unit having a positive refractive power,
    a negative lens unit having a negative refractive power, and
    a rear positive lens unit having a positive refractive power,
wherein said one lens unit caused to decenter corresponds to said negative lens unit.

8. An optical device according to claim 7, wherein zooming is effected by varying magnifying power of said negative lens unit and/or said rear positive lens unit.

9. An optical device according to claim 1, wherein said objective lens means includes, from front to rear,
    a front lens unit having a negative refractive power,
    an intermediate lens unit having a positive refractive power, and
    a rear lens unit having a negative refractive power,
wherein said one lens unit caused to decenter corresponds to said intermediate lens unit.

10. An optical device according to claim 9, wherein said intermediate lens unit and said rear lens unit are movable along the optical axis to vary magnifying power of said objective lens means, and wherein an image magnification of said intermediate lens unit in its telephoto end satisfies said condition.

11. An image stabilizing device comprising:
    objective lens means including a fixed lens unit stationary with respect to a direction perpendicular to an optical axis of said image stabilizing device and a compensation lens unit capable of decentering with respect to the optical axis;
    detecting means for detecting a shake of said objective lens means; and
    lens driving means for driving said compensation lens unit on the basis of an output of said detecting means,
    wherein the following condition is satisfied:

$$-1.4 < \beta c < -0.7$$

where $\beta c$ represents an image magnification of said compensation lens unit.

12. An image stabilizing device according to claim 11, wherein said objective lens means includes a lens unit movable along the optical axis for zooming, and wherein said image magnification $\beta c$ of said compensation lens unit is a value obtained when said movable lens unit is in its telephoto end.

13. An image stabilizing device according to claim 11, wherein said objective lens means consists of, from front to rear, a front lens unit having a positive refractive power, an intermediate lens unit having a negative refractive power, and a rear lens unit having a positive refractive power, wherein said intermediate lens unit is caused to decenter to stabilize an image.

* * * * *

UNITED STATES PATENT AND TRADEMARK OFFICE
CERTIFICATE OF CORRECTION

PATENT NO. : 5,069,537

DATED : December 3, 1991

INVENTOR(S) : NOZOMU KITAGISHI

It is certified that error appears in the above-identified patent and that said Letters Patent is hereby corrected as shown below:

On The Title Page:

In the Abstract

Line [56], "0047012 2/1987 Japan......350/500" should be deleted, as a duplication of the next line.

Column 1

Line 16, "dropped" should read --lowered--.

Column 4

Line 54, "+1 mm," should read --$\pm 1$ mm,-- and "+0.012 mm," should read --$\pm 0.012$ mm,--.

Column 5

Line 3, "$\delta = 1(1-\cos\theta)$" should read --$\delta = \ell(1-\cos\theta)$--.

Line 10, "R =" should read --R'--

Line 26, "subjected to the" should read --made--.

UNITED STATES PATENT AND TRADEMARK OFFICE
CERTIFICATE OF CORRECTION

PATENT NO. : 5,069,537
DATED : December 3, 1991
INVENTOR(S) : NOZOMU KITAGISHI It is certified that error appears in the above-identified patent and that said Letters Patent is hereby corrected as shown below:

<u>Column 7</u>

Line 45, "rougher" should read --looser--.

Signed and Sealed this

Eighteenth Day of May, 1993

Attest:

MICHAEL K. KIRK

*Attesting Officer*     Acting Commissioner of Patents and Trademarks